Figure 3:
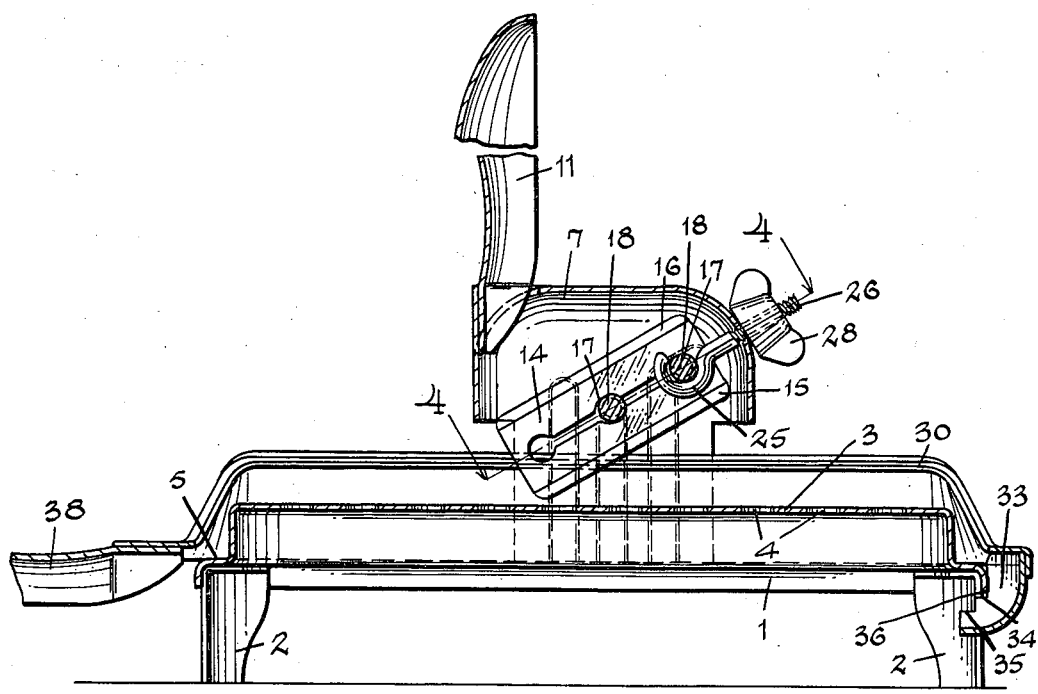

Sept. 10, 1935.  M. R. HATCH  2,013,801
FOOD CUTTER
Filed June 2, 1933   2 Sheets-Sheet 1
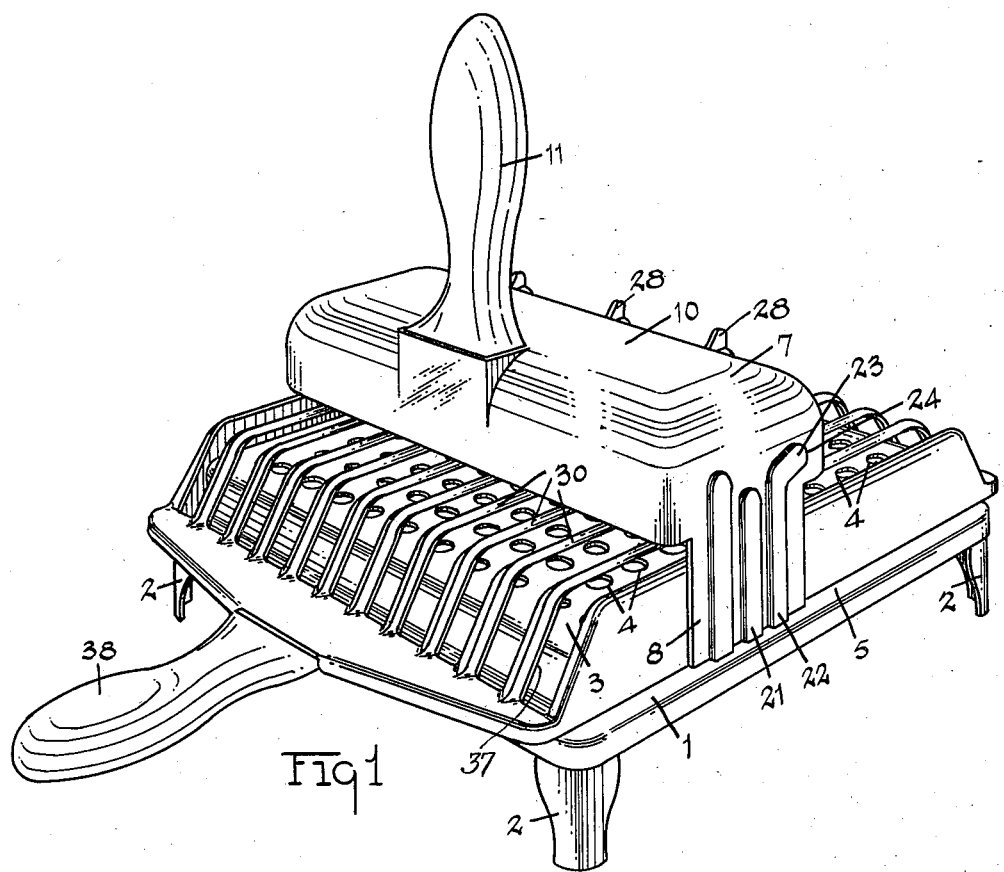
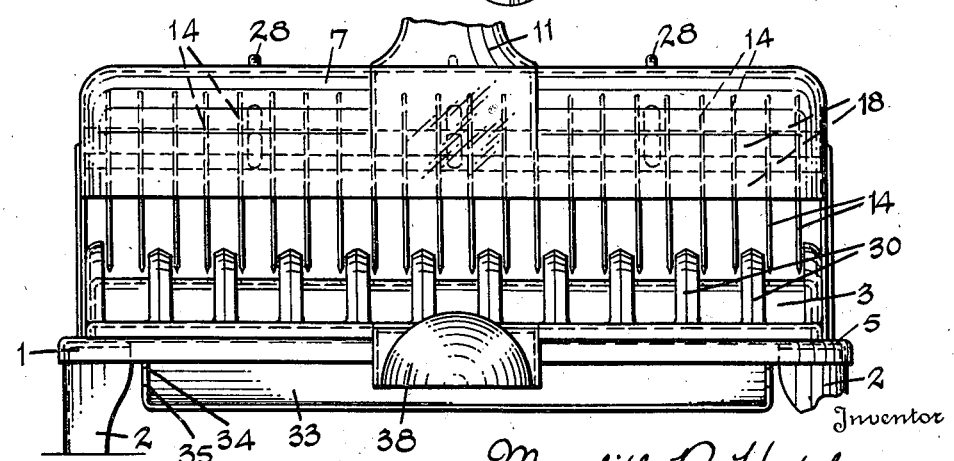
Inventor
Meredith R. Hatch
By Faust H. Crampton
Attorney Patented Sept. 10, 1935

2,013,801

UNITED STATES PATENT OFFICE 2,013,801

FOOD CUTTER

Meredith R. Hatch, Toledo, Ohio, assignor of one-half to George R. Corrigan, Sylvania, Ohio Application June 2, 1933, Serial No. 674,062

8 Claims. (Cl. 17—25)

My invention relates to devices for preparing foods in contemplation of later consumption thereof. The invention particularly relates to devices for stripping or dicing foods, such as fruit, vegetables, meats, and the like, in preparation for cooking or serving of the foods.

The flavor and tastiness of foods is often destroyed by prolonged cooking or application of a heat that is requisite to thorough cooking or food preparation. Therefore, my invention has for an object to provide a device for partially severing or dicing the surfaces thereof to enable rapid transmission of heat to all parts of the food in cooking at substantially the same time, maintaining the unity of a piece of food body for ease of manipulation in a cooking or serving utensil.

The invention has for a particular object to provide a food cutter having a food supporting surface provided with means for engaging the food to prevent lateral sliding and slipping thereof during the cutting operation. Another particular object of the invention is to provide a food cutter having an open grill for clampingly engaging the food on the food supporting surface. A cutting tool holder having a plurality of cutting elements or blades connected thereto is provided and adapted to be reciprocated over the food supporting surface and the grill for cutting or stripping the food located between the grill and the food supporting surface. The food thus operated on has increased surfaces which may be later exposed to cooking heat, insuring rapid cooking and maintenance of flavor and tenderness.

Another object of the invention is to provide a food cutter, the cutting medium of which is contained within a hooded carrier which acts as a safety guard against property or body injury and yet may be easily dismantled for cleansing and maintaining in an odorless condition.

The invention has for a further object to provide a food cutter particularly adaptable to stripping or cubing of meats, especially meats cut and served usually in slab form, such as steaks, ham, and boned chops. In that connection, the invention provides a device of simple construction, at a cost within the reach of householders, and which may be readily operated by an unskilled user where heretofore devices for effecting the same results are of a complex construction necessitating their being exclusively maintained in meat dispensing establishments, largely by reason of their high cost and requirement for operation of a skilled operator.

The invention consists of other features and advantages which will appear from the following description and upon examination of the drawings. Structures containing the invention may partake of different forms and may be varied in their details and still embody the invention. To illustrate a practical application of the invention, I have selected a food cutter embodying the invention as an example of the various structures and details thereof that contain the invention and shall describe the selected structure hereinafter, it being understood that variations may be made without departing from the spirit of the invention. The practical structure selected is shown in the accompanying drawings.

Figure 4:
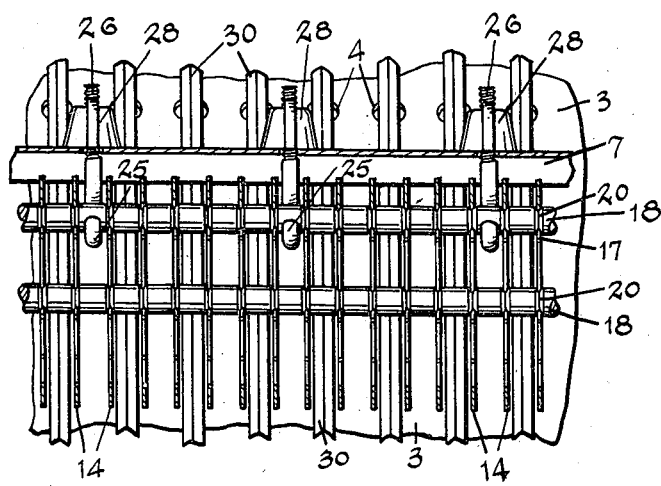

Fig. 1 of the accompanying drawings illustrates a perspective view of the food cutter chosen for purposes of illustration. Fig. 2 illustrates an end view of the food cutter. Fig. 3 illustrates a view of a longitudinal section of the food cutter. Fig. 4 illustrates a view of a section taken on the plane of the line 4—4 indicated in Fig. 3.

A food cutter partaking of the features of my invention has a frame on which a food supporting or work table may be provided having suitable legs for the support thereof. The surface of the work table may be provided with a plurality of recesses or openings so that when a piece or unit of food is placed thereon, portions of the food will, by reason of the usual moldability and elasticity of the food, fit or yawn into and through the recesses or openings, tending to anchor the food in place on the table against sliding or lateral shifting movements over the surface thereof. In order to hold the food as against lifting or, as in the case of tendon and fiber containing foods, from following the cutting tool, a suitable holder or open grill is provided which, when in operation, is clamped down over the food so that the food is held between the work table and the grill. The cutting tool holder provided by my invention has a pair of legs adapted to slidably ride a ledge or shoulder extending from the work table for that purpose. The holder has a hooded portion in which is located a plurality of cutting elements. The cutting elements are preferably formed of thin surgical steel having openings through which extend shafts for connecting the elements to the holder. If desired, the shafts may be dimensionally designed to connect any of the well known razor blades which may be put to use in this economical and efficient manner. The shafts have a plurality of notches or parallel grooves in which the edges of the openings of the cutting elements may rest and thus hold the cutting element against dislodgement. The shafts are supported in grooves formed in the walls of the hooded portion of the holder. Each shaft supporting groove extends parallel to the other shaft supporting groove, one of the said grooves connecting with a groove extending angularly to the common line of extension of two first named shaft supporting grooves. The shafts, after being inserted through the openings in the blades, are engaged at their ends within the parallel grooves and moved toward the inner termini thereof. One of the shafts is then moved into the angular groove away from the other shaft until the blades are tightly held therebetween. In order to move the said shaft through the angular groove and maintain it in position, thereby locking the blades in position, a plurality of hooked members extend through the hooded portion of the holder and are threadably engaged by conveniently operated wing nuts. Thus, by merely loosening the wing nuts and moving the shafts through the grooves of the holder, the holder and its parts may be readily dismantled for cleaning and reassembled for subsequent use.

In the particular construction illustrated in the drawings, a frame 1 is provided having legs 2 for the support thereof. A food supporting portion or work table 3 is supported on the frame 1 and has suitable openings 4 for holding the food to be operated upon against slipping or lateral movements over the table 3, as described above. The frame and table may be formed of suitably shaped sheet metal easily cleansed. The frame 1 has shoulder portions 5 for slidably supporting a cutting tool holder 7.

The cutting tool holder 7 has a pair of legs 8 connected one at each end to a hood portion 10. Each of the legs 8 is adapted to be slidably moved over the surface of one of the shoulders 5 by means of the conveniently disposed handle 11, preferably connected to the hood portion 10. The tool holder 7 thus forms a slidable bridge over the work table 3 and when provided with a plurality of cutting elements 14 will engage and cut foods as are located on the table 3.

The cutting elements 14 are preferably of slight thickness and may be double edged, as at 15 and 16, for reversibility and interchanging of cutting edges. Each element 14 is provided with openings 17 through which the shafts 18 extend to connect the elements 14 to the holder 7. The shafts 18 are provided with a plurality of spaced parallel grooves 20 into which the edges of the openings 17 may be moved to hold the cutting elements in a line at right angles to the axis of the shafts 18. The shafts are removably connected to the holder 7 by grooved portions 21 and 22 formed in the legs 8 and in which opposite ends of the shafts are adapted to fit.

The groove portions 21 and 22 extend parallel to each other along each leg 8 from the bottom edge thereof to approximately a point where the leg 8 joins the hood portion 10. The groove portion 22 connects with another groove portion 23 which extends away from the groove portion 21 and at an angle to the line of the groove 22 and terminates, as at 24, to form a shoulder against which the end surfaces of one of the shafts 18 may be moved. Thus, it will be seen that one of the shafts 18 may be inserted through one of the openings 17 of each of the cutting elements 14 and the other of the shafts may be inserted through the other of the openings 17 of each cutting element so that the edges of the openings 17 are each located in one of the parallel grooves formed in each shaft 18. The ends of one of the shafts 18 are then placed in the groove 21 of either leg 8 and ends of the other of the shafts 18 placed in the groove 22 and both shafts moved along the said grooved portions 21 and 22. The shaft in the groove 22 is moved into the groove 23, thus locating the edges 15 of the cutting elements 14 at a favorable angle to the horizontal and adaptable to cutting materials on the table 3.

In order to hold the shaft 18, which is located in the grooved portions 23 in position during the use of the cutting elements, suitable hooks 25 are removably connected to the shaft and have threaded shanks 26 which extend through the wall of the hood portion 10 and are engaged by suitable wing nuts 28. Thus, by tightening the wing nuts 28, the cutting elements will be tightly held in position and may be removed for cleaning purposes by releasing the wing nuts and dismantling.

In order to hold materials on the work table 3 during the cutting operation and to prevent the material from being drawn by the cutting elements 14, a grill 30 is provided and adapted to be hingedly connected to the frame 1. The grill is provided with a hooked portion 33 having stepped shoulder portions 34 and 35. The shoulder portions 34 and 35 are adapted to engage the frame 1, as at 36, each according to the height desired to maintain the grill, dependent on the thickness of the material operated on, in superimposed nesting relation to the work table 3. The grill 30 has elongated openings 37 through which the cutting elements 14 extend to engage foods held between the grill and the work table and may be moved to cut the food. The food body surface may be cut in one dimension by operation of cutting elements and then turned at right angles to its original position and cut to cube or dice the food. The grill 30 is provided with a suitable handle 38 for manually holding the grill in position during the cutting operation.

While in accordance with the provision of the statutes I have illustrated and described the best form of my invention now known to me, those skilled in the art will understand that many changes may be made in the form of the construction disclosed without departing from the spirit of my invention, as set forth in the appended claims, and that certain features of my invention may be used to advantage without a corresponding use of other features.

I claim:

1. In a food cutter, a work table, the work table having means for holding the food, a plurality of cutting tools, a cutting tool carrier, the tool carrier having a hood portion and a pair of leg portions, the leg portions adapted to be slidably moved over the work table, a pair of shafts, each of the shafts having parallel grooves in spaced relation to each other, grooves formed in the leg portions adapted to receive the ends of the shafts, means for locating each cutting element in position within each of the first named parallel grooves, and means extending within the hood portion for holding the shafts in position with respect to the second named grooves whereby the cutting elements may engage food materials on the surface of the work table.

2. A food cutter having a frame, the frame having a food supporting portion, shoulder portions formed on either side of the food supporting portion and extending substantially the length of said food supporting portion, a plurality of cutting blades, a blade holder, the blade holder having depending leg portions adapted to slidably engage the shoulder portions, means for removably mounting the said plurality of cutting blades in fixed parallel relation to one another on the blade holder, and a handle connected to the blade holder for slideably moving the same on and along the shoulder portions and in fixed superimposed relation to the food supporting portion during the food cutting operation.

3. A food cutter having a food supporting portion adapted to receive food for cutting, the said food supporting portion having means tending to resist lateral shifting movement of the food with respect to the said food supporting portion and the surface thereof, a shoulder extending from the said food supporting portion, a plurality of cutting elements, and a member for supporting the said plurality of cutting elements in fixed parallel relation to each other, said member having a leg portion, the leg portion being disposed for slideable engagement on the shoulder during the cutting operation whereby the cutting elements will engage and cut the food located on the food supporting portion and be maintained in fixed superimposed relation thereto when the member is slideably moved along the shoulder.

4. A food cutter having a food supporting portion adapted to receive food for cutting, the said food supporting portion having means tending to resist lateral shifting movement of the food with respect to the said food supporting portion and the surface thereof, shoulders extending from the said food supporting portion, and a plurality of cutting elements, a member for supporting the said plurality of cutting elements in fixed parallel relation to each other, said member having a pair of leg portions, the leg portions being disposed for slideable engagement on the shoulders during the cutting operation whereby the cutting elements will engage and cut the food located on the food supporting portion when the member is slideably moved along the shoulders.

5. A food cutter having a table portion, adapted to receive food for cutting, the table portion having a plurality of apertures formed in the surface thereof tending to prevent shifting lateral movements of the food with respect to the table portion and surface thereof, the table portion having an offset shoulder extending along one dimension thereof, a plurality of cutting blades, a holder member for supporting the cutting blades in fixed parallel relation to each other, the holder member having a leg portion adapted to slideably move on and along the shoulder, and a handle connected to the said holder member for causing the member to move on and along the shoulder portion whereby the said plurality of blades may engage the food located on the table portion.

6. A food cutter having a table portion adapted to receive food for the cutting thereof, the table portion having shoulders extending therefrom and along the sides thereof, a grill member adapted to be located in spaced superimposed relation to the table portion, the grill member having a plurality of parallel elongated openings extending parallel to the shoulders, a plurality of cutting blades, a holder member for supporting the said plurality of cutting blades in fixed spaced parallel relation to each other, the member adapted to be located in spaced superimposed relation to the grill member and so that the cutting blades extend through the elongated openings toward the table portion, the holder member having depending leg portions disposed for slidable movement on and along the shoulders, and a handle connected to the said holder member for moving the same on and along the shoulders whereby food located between the grill member and the table portion will be cut by the cutting blades.

7. A food cutter having a table portion adapted to receive food for the cutting thereof, the table portion having shoulders extending therefrom and along the sides of the table portion, a grill member removably hinged to the table portion and adapted to be located in spaced superimposed nesting relation to the table portion, the grill member having a plurality of parallel elongated openings extending parallel to the shoulders, a plurality of cutting blades, a blade holder member for supporting the said plurality of cutting blades in fixed spaced parallel relation to each other, the blade holder member being adapted to be located in spaced superimposed nesting relation to the grill member and so that the cutting blades extend through the elongated openings toward the table portion, the blade holder member having depending leg portions disposed for slidable movement on and along the shoulders, and a handle connected to the said blade holder member for moving the blade supporting member on and along the shoulders and in fixed parallel relation to the table portion whereby food located between the grill member and the table portion will be cut by the cutting blades.

8. A food cutter, a work table for supporting food to be cut, the surface of the work table having means tending to resist lateral movement of the food during cutting, a blade holder, the blade holder having a hood portion and a pair of leg portions, the leg portions being adapted to be slidably moved over the work table, a pair of shafts, each of the shafts having spaced parallel notched portions, a plurality of cutting blades, each of said plurality of cutting blades having a pair of openings, each opening being adapted to receive a notched portion of one of said pair of shafts, grooves being formed in the leg portions and adapted to receive the ends of the said pair of shafts, and means for removably engaging the shafts for locking the blades in position on the holder whereby the blades may engage the food located on the work table.

MEREDITH R. HATCH.